(12) United States Patent
Okaza et al.

(10) Patent No.: US 6,962,059 B2
(45) Date of Patent: Nov. 8, 2005

(54) REFRIGERATING CYCLE DEVICE

(75) Inventors: Noriho Okaza, Kyotanabe (JP); Fumitoshi Nishiwaki, Nishinomiya (JP); Yuji Yoshida, Itami (JP); Mitsuhiro Ikoma, Ikoma (JP); Hiroshi Hasegawa, Katano (JP); Hidenobu Shintaku, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 96 days.

(21) Appl. No.: 10/343,539

(22) PCT Filed: Jul. 30, 2001

(86) PCT No.: PCT/JP01/06521

§ 371 (c)(1),
(2), (4) Date: Aug. 19, 2003

(87) PCT Pub. No.: WO02/10655

PCT Pub. Date: Feb. 7, 2002

(65) Prior Publication Data

US 2004/0123621 A1    Jul. 1, 2004

(30) Foreign Application Priority Data

Aug. 1, 2000   (JP) ............................. 2000-232634

(51) Int. Cl.[7] .................. F25B 41/00; F25B 43/02; C09K 5/00

(52) U.S. Cl. ..................... 62/513; 62/468; 62/470; 252/67; 252/68; 252/69

(58) Field of Search ....... 62/513, 468, 470; 252/67–69

(56) References Cited

U.S. PATENT DOCUMENTS

| | | | | |
|---|---|---|---|---|
| 5,184,478 A | * | 2/1993 | Kutsuna et al. | 62/468 |
| 5,624,595 A | * | 4/1997 | Sato et al. | 252/68 |
| 5,724,832 A | * | 3/1998 | Little et al. | 62/61 |
| 5,924,485 A | | 7/1999 | Kobayashi et al. | |
| 6,044,660 A | * | 4/2000 | Numoto et al. | 62/468 |

(Continued)

FOREIGN PATENT DOCUMENTS

EP     0976991 A2    2/2000

(Continued)

OTHER PUBLICATIONS

"Development of compact heat exchangers for $CO_2$ air-conditioning systems"—J. Petersen et al. International Journal of Refrigeration, (1998), vol. 21, No. 3, pp. 180-193.

(Continued)

Primary Examiner—Cheryl Tyler
Assistant Examiner—Filip Zec
(74) Attorney, Agent, or Firm—RatnerPrestia

(57) ABSTRACT

To prevent heat transfer inhibition and an increase in pressure loss due to refrigerating machine oil discharged into a cycle, and to provide a compact and highly efficient refrigerating cycle apparatus using carbon dioxide gas ($CO_2$). In a refrigerating cycle apparatus having at least a compressor, a radiator, a decompressor, a vaporizer and piping for successively connecting them, and provided with a refrigerant circuit in which refrigerant circulates in the compressor, the radiator, the decompressor, the vaporizer and the piping, carbon dioxide gas ($CO_2$) is enclosed as said refrigerant, and the drop in heat transfer rate and the increase in pressure loss in the heat exchanger can be restrained to very low levels by keeping oil enclosing volume in the refrigerant circuit to the quantity of carbon dioxide gas ($CO_2$) enclosed as refrigerant (weight %) to less than 40 weight % and more than 0, resulting in practical elimination of the increase in size and the impact on the drop in efficiency of the heat exchanger.

14 Claims, 12 Drawing Sheets

U.S. PATENT DOCUMENTS 6,185,955 B1 * 2/2001 Yamamoto ................. 62/470
6,306,803 B1 * 10/2001 Tazaki ..................... 508/539
6,339,937 B1 * 1/2002 Makihara et al. ............ 62/503

FOREIGN PATENT DOCUMENTS

| EP | 0976991 A3 | 3/2000 |
| JP | 59-99079 | 6/1984 |
| JP | 7-18602 | 1/1995 |
| JP | 07-18602 | 3/1995 |
| JP | 10-311697 | 11/1998 |
| JP | 11-173688 | 7/1999 |
| JP | 11-343970 | 12/1999 |
| JP | 2000-46420 | 2/2000 |
| JP | 2000-46421 | 2/2000 |
| JP | 2000-55488 | 2/2000 |
| JP | 2000-110724 | 4/2000 |
| JP | 2000-179959 | 6/2000 |
| JP | 2001-133075 | 5/2001 |
| JP | 2001-194081 | 7/2001 |
| JP | 2001-221580 | 8/2001 |
| WO | WO 90/07683 | 7/1990 |
| WO | WO 00/32934 | 6/2000 |

OTHER PUBLICATIONS

Japanese Search Report for Application No. PCT/JP01/06521 dated Aug. 1, 2000.

English Translation Form PCT/ISA/210.

* cited by examiner

Ratio of oil to enclosed quantity of carbon dioxide gas ($CO_2$) (weight %)

Ratio of oil to enclosed quantity of carbon dioxide gas ($CO_2$) (weight %)

REFRIGERATING CYCLE DEVICE

THIS APPLICATION IS A U.S. NATIONAL PHASE APPLICATION OF PCT INTERNATIONAL APPLICATION PCT/JP01/06521.

TECHNICAL FIELD

The present invention relates to a refrigerating cycle apparatus for refrigerating machines and air conditioners using carbon dioxide gas as refrigerant.

BACKGROUND ART

Conventional refrigerating cycle apparatus each including a compressor, a radiator, a decompressor, a vaporizer connected to one another are used in air conditioners for buildings, air conditioners for vehicle use, electric (or freezers) refrigerators, refrigerating or freezing warehouses, showcases and the like. In such conventional apparatus, hydrocarbons containing fluorine atoms were used as a refrigerant.

Especially hydrocarbons containing both fluorine atoms and chlorine atoms (hydrochlorofluorocarbons (HCFCs)) were extensively used in refrigerating cycle apparatus because of their high performance, non-flammability and non-toxicity to human bodies.

However, it was revealed that HCFCs (hydrochlorofluorocarbons), because they contain chlorine atoms, would deplete the ozone layer when they were discharged into the atmosphere and eventually reached the stratosphere. Accordingly, HCFCs are being replaced by HFCs (hydrofluorocarbons), which contain no chlorine atoms. However, even though they have no property to deplete the ozone layer, they have a significant greenhouse effect on account of their long life in the atmosphere, and are not necessarily a satisfactory refrigerant for preventing global warming, which is a matter of grave concern nowadays.

In place of the aforementioned HCFCs and HFCs containing halogen atoms, the feasibility of refrigerating cycle apparatuses using carbon dioxide gas ($CO_2$) as refrigerant, of which the ozone depletion factor is zero and the global warming factor is far smaller than that of hydrocarbons containing halogen atoms. For instance, in Japanese Patent Laid-Open No. 7-18602, there is proposed a refrigerating cycle apparatus using carbon dioxide gas ($CO_2$)

The critical temperature of carbon dioxide gas ($CO_2$) here is 31.1° C., and its critical pressure is 7372 kPa. In a refrigerating cycle apparatus using it, the cycle can be transcritical as will be described with reference to FIG. 11.

FIG. 11 is a Mollier diagram of the refrigerating cycle where carbon dioxide gas ($CO_2$) is used as refrigerant. As indicated by A-B-C-D-A in the diagram, by depriving external fluid such as air of heat with the latent heat of vaporization, the external fluid is cooled by a compression stroke (A-B) of compressing $CO_2$ in the gaseous phase state with a compressor, the cooling stroke (B-C) of cooling $CO_2$ in the supercritical state of high temperature and high pressure with a radiator (gas cooler) the decompression stroke (C-D) of reducing its pressure with a decompressor, and the vaporization stroke (D-A) of vaporizing $CO_2$ in the vapor-liquid two phase state with a vaporizer.

In FIG. 11, a line (B-C), positioned by the gas-liquid critical point CC toward the higher pressure side, crosses neither the saturated liquid curve nor the saturated steam curve. Thus, although the shift from the saturated steam region (the vapor-liquid two phase region) to the heated steam region (the gaseous phase region) in the vaporization stroke (D-A) takes place in a similar way to what takes place with HCFCs or HFCs, there is no condensation stroke, which is present with HCFCs or HFCs, in the region beyond the critical point CC (the supercritical region), but there comes the cooling stroke, in which $CO_2$ is cooled without being liquefied.

As the working pressure of the refrigerating cycle apparatus using carbon dioxide gas ($CO_2$) then is about 3.5 MPa on the lower pressure side and about 10 MPa on the higher pressure side, the working pressure is higher than where HCFCs or HFCs are used, the higher side pressure and the lower side pressure being about 5 to 10 times as high as in a refrigerating cycle apparatus using HCFCs or HFCs.

Next will be described the configuration of the refrigerating cycle apparatus. As the critical temperature of the refrigerating cycle apparatus using carbon dioxide gas ($CO_2$) mentioned above is 31.1° C. and its critical pressure is 7372 kPa, its configuration is such that the high pressure side circuit (the refrigerant circuit from the discharge part of the compressor via the radiator to the inlet part of the decompressor) is used in the supercritical region, while the configuration of a usual refrigerating cycle apparatus is, as shown in FIG. 13, consists of a main route provided with a compressor 210 for raising the pressure of a refrigerant, a radiator 220 for cooling the refrigerant, a decompressor 230 for reducing the pressure of the refrigerant to its vaporization pressure and a vaporizer 240 for vaporizing and gasifying the refrigerant.

In this main route, the refrigerant, which has been raised in pressure by the compressor 210 and is in a supercritical state, is cooled by the radiator 220, reduced in pressure by the decompressor 230 to become wet steam and, after being turned into a gaseous phase by the vaporizer 240, is returned to the compressor 210.

If such a refrigerating cycle apparatus is configured in a similar way of thinking to the concept of the conventional refrigerating cycle apparatus using chlorofluorocarbon gas, where it is to be used for a vehicle-mounted air conditioner, it is a common practice to enclose about 500 g of carbon dioxide gas ($CO_2$) as refrigerant and about 300 g of refrigerating machine oil as lubricating oil for the compressor 210. Thus, oil in a ratio of about 60 weight % of the enclosed carbon dioxide gas ($CO_2$) is enclosed.

However, in a refrigerating cycle apparatus in which a large quantity of oil is enclosed similarly to such a refrigerating cycle apparatus using chlorofluorocarbon gas, the quantity of refrigerating machine oil discharged into the cycle is also large, and where carbon dioxide gas ($CO_2$) is used for which the high pressure side circuit (the refrigerant circuit from the discharge part of the compressor via the radiator to the inlet part of the decompressor) is used in the supercritical region and there is no condensate, the refrigerating machine oil discharged into the cycle may stick to the inner walls of the pipes of the radiator 220 or become scattered in a misty form, inviting inhibition of heat transfer or an increase in pressure loss and thereby becoming a cause of an enlargement of the size or a drop in the efficiency of that refrigerating cycle apparatus.

On the other hand, as the refrigerant channels of heat exchangers used in the radiator and the vaporizer of a refrigerating cycle apparatus using carbon dioxide gas ($CO_2$) as refrigerant, a flat tube 21 configured of a plurality of small bore through-holes 21a is employed as shown in the schematic configurational diagram of FIG. 12 to bear the pressure of the high pressure refrigerant.

Here, when oil is discharged together with $CO_2$ from the compressor, the oil will become a factor to inhibit the vaporization of the $CO_2$ in the refrigerant channels, especially in the refrigerant channels in the vaporizer having a plurality of small bore through-holes, inviting inhibition of heat transfer or an increase in pressure loss, and accordingly there has been found the problem that the size of the refrigerating cycle apparatus is increased or its efficiency deteriorated.

DISCLOSURE OF THE INVENTION

An object of the present invention, intended to solve the problems of the prior art noted above, is to provide a compact and highly efficient refrigerating cycle apparatus using carbon dioxide gas ($CO_2$), capable of preventing heat transfer decreases and pressure loss increases in heat exchangers.

To achieve the above object, a first invention of the present invention (corresponding to claim 1) is a refrigerating cycle apparatus having at least a compressor for raising the pressure of refrigerant; a radiator for cooling the refrigerant raised in pressure by said compressor; a decompressor, arranged further downstream of the refrigerant flow than said radiator, for decompressing and expanding said cooled refrigerant; a vaporizer for heating the refrigerant decompressed by said decompressor; and piping for consecutively connecting said compressor, said radiator, said decompressor and said vaporizer, and provided with a refrigerant circuit in which said refrigerant circulates within said compressor, said radiator, said decompressor, said vaporizer and said piping, wherein carbon dioxide gas ($CO_2$) is enclosed as said refrigerant, and the quantity of oil in said refrigerant circuit is not more than 40 weight % of the enclosed quantity of said $CO_2$ and more than 0.

A second invention of the present invention (corresponding to claim 2) is the refrigerating cycle apparatus, as set forth in the first invention, wherein said compressor is a linear compressor driven by a linear motor.

A fourth invention of the present invention (corresponding to claim 4) is the refrigerating cycle apparatus, as set forth in the first or the second invention, wherein said oil is not used except in assembling said refrigerating cycle apparatus.

A fifth invention of the present invention (corresponding to claim 5) is a refrigerating cycle apparatus having at least a compressor for raising the pressure of refrigerant; a radiator for cooling the refrigerant raised in pressure by said compressor; a decompressor, arranged further downstream of the refrigerant flow than said radiator, for decompressing and expanding said cooled refrigerant; a vaporizer for heating the refrigerant decompressed by said decompressor; and piping for consecutively connecting said compressor, said radiator, said decompressor and said vaporizer; and provided with a refrigerant circuit in which said refrigerant circulates within said compressor, said radiator, said decompressor, said vaporizer and said piping, wherein carbon dioxide gas ($CO_2$) is enclosed as said refrigerant, and said vaporizer has a plurality of through-holes formed in a flat tube as a refrigerant channel, and the oil circulating rate, which is the ratio of the quantity of oil circulating in any part of said refrigerant circuit except the inside of said compressor to the quantity of $CO_2$ circulating in said part, is not more than 1.5 weight %.

A sixth aspect of the present invention is the refrigerating cycle apparatus, as set forth in the fifth aspect of the present invention, wherein the hydraulic power-equivalent diameter of said through-holes is 0.2 mm to 2.0 mm.

A seventh aspect of the present invention is the refrigerating cycle apparatus, as set forth in the first or the fifth aspect of the present invention, further provided with an auxiliary heat exchanger for exchanging heat between the radiating side refrigerant channel formed between the refrigerant outlet side of said radiator and the inlet side of said decompressor and the vaporizing side refrigerant channel formed between the refrigerant outlet side of said vaporizer and the intake part of said compressor, wherein:

the vaporization side refrigerant channel within said auxiliary heat exchanger has a plurality of through-holes formed in a flat tube.

An eighth aspect of the present invention is the refrigerating cycle apparatus, as set forth in the fifth or the seventh aspect of the present invention, further provided with first oil separator disposed between said compressor and said radiator, and first oil return means, disposed between said first oil separator and said compressor, of returning oil separated by said first oil separator to said compressor.

A ninth aspect of the present invention is the refrigerating cycle apparatus, as set forth in the eighth aspect of the present invention, wherein said first oil separator is integrated with said compressor.

A tenth invention of the present invention (corresponding to claim 10) is the refrigerating cycle apparatus, as set forth in the fifth or the seventh invention, further provided with a second oil separator disposed between the refrigerant outlet of said radiator and the refrigerant inlet of said auxiliary heat exchanger, and second oil return means, disposed between said second oil separator and said compressor, of returning oil separated by said second oil separator to said compressor.

An eleventh invention of the present invention (corresponding to claim 11) is the refrigerating cycle apparatus, as set forth in the fifth or the seventh invention, wherein said compressor is a linear compressor driven by a linear motor.

A twelfth invention of the present invention (corresponding to claim 12) is the refrigerating cycle apparatus, as set forth in the seventh invention, wherein a hydraulic power-equivalent diameter of said through-holes of the vaporization side refrigerant channel within said auxiliary heat exchanger is not smaller than a hydraulic power-equivalent diameter of the through-holes of the outlet of said vaporizer.

A thirteenth invention of the present invention (corresponding to claim 13) is the refrigerating cycle apparatus, as set forth in the seventh invention, wherein, within said auxiliary heat exchanger, said radiating side refrigerant channel also has a plurality of through-holes formed in a flat tube.

DESCRIPTION OF SYMBOLS

Figure 1:
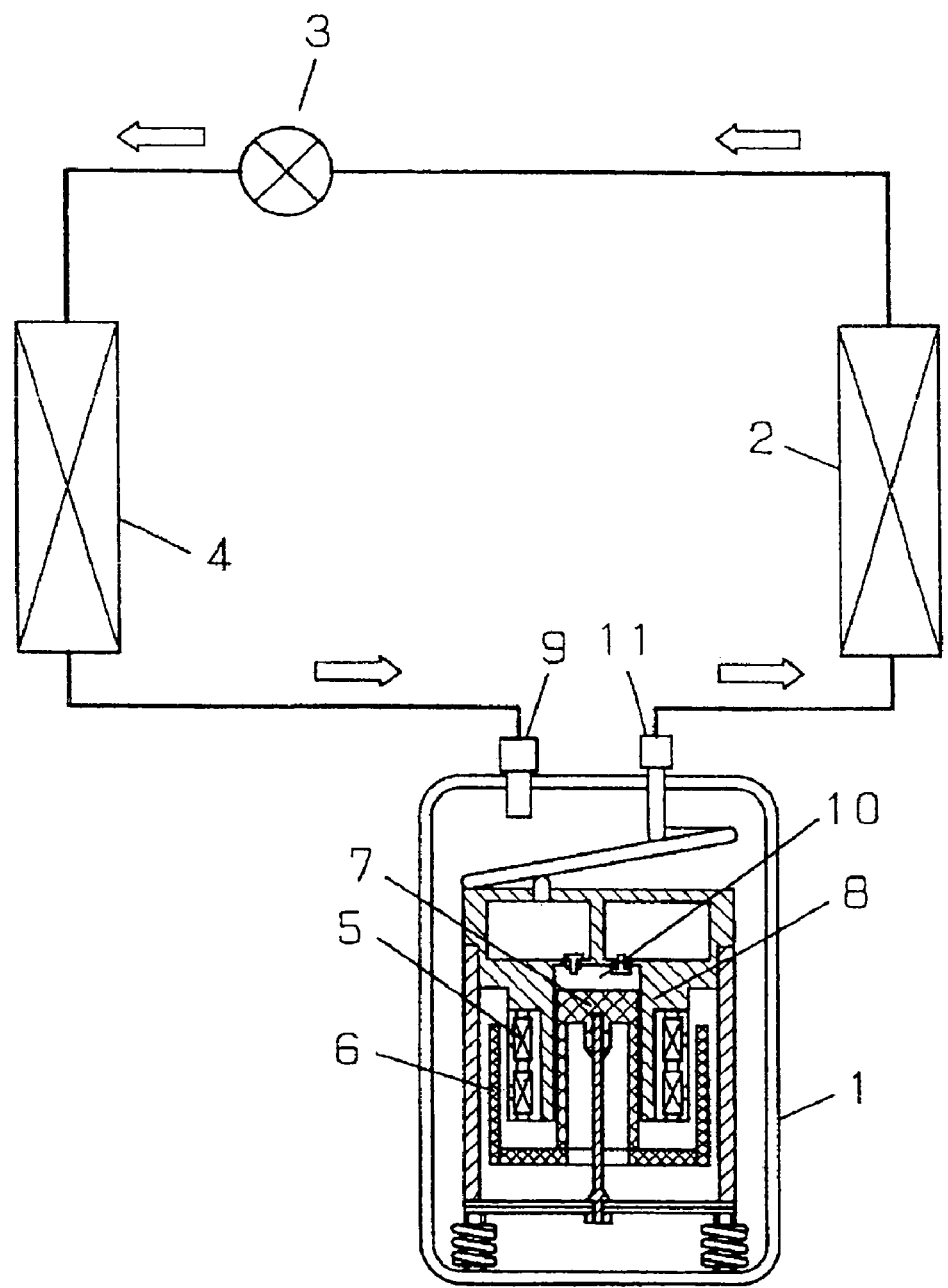
FIG. 1 is a configurational diagram of a refrigerating cycle apparatus in one implementation of the present invention.

1 Compressor
2 Radiator
3 Decompressor
4 Vaporizer
5 Stator of linear motor
6 Moving element of linear-motor
7 Piston
8 Cylinder
41 Compressor
42 Radiator
43 Decompressor
44 Vaporizer
45, 45' Oil separator
46, 46' Auxiliary heat exchanger
47, 47' Auxiliary decompressor
48, 48' Auxiliary piping route
21 Flat tube
21a Through-hole
22 Fin

BEST MODES FOR CARRYING OUT THE INVENTION

Embodiments of the present invention will be described below with reference to drawings.

(Embodiment 1)

FIG. 1 shows a configuration of a refrigerating cycle apparatus in one embodiments of the invention; in the drawing, a refrigerant circuit is configured by using carbon dioxide gas ($CO_2$) as refrigerant and successively connecting by piping a compressor 1 for raising the pressure of this refrigerant; a radiator 2 for cooling the refrigerant whose pressure has been raised by this compressor 1; a decompressor 3, arranged further downstream of the refrigerant than this radiator 2, for reducing the pressure of the cooled refrigerant to its vaporization pressure and expanding it; and a vaporizer 4 for vaporizing and gasifying the refrigerant whose pressure has been reduced by this decompressor 3.

Further, the compressor 1 is a linear compressor, configured of a cylinder 8, a piston 7 reciprocatingly driven by a linear motor configured of a stator 5, a moving element 6 and so forth.

Whereas such a linear compressor requires a sliding motion of the cylinder and the piston in a state of mutual contact, because of the absence of need for a bearing, which a conventional compressor using a rotary motor would require, this compressor has characteristics that it is smaller in sliding part in a compressive action than a conventional reciprocating compressor or rotary compressor and that its sliding face theoretically is hardly subject to any load.

For this reason, this embodiment of the invention requires the application of only a small quantity (a few g) of oil to the sliding parts in assembling the linear compressor 1 to be able to operate free of trouble without enclosing oil as lubricant into any other part of the linear compressor 1 or in the refrigerant circuit.

Therefore, where this refrigerating cycle apparatus is used in a car-mounted air conditioner or the like, since about 500 g of carbon dioxide gas ($CO_2$) is enclosed as refrigerant, oil in a quantity corresponding to only about 0.5 weight % of the enclosed quantity of carbon dioxide gas ($CO_2$) is present in the refrigerant circuit.

The operation of the refrigerating cycle apparatus configured as described above will be explained below.

The refrigerant (carbon dioxide gas) taken in through the intake pipe 9 of the linear compressor 1 is guided to a compression chamber 10 in the cylinder 8 and, after being compressed to a high pressure (for instance, about 10 MPa in this embodiment) by the piston 7, which is connected to the moving element 6 of the linear motor and reciprocating, is discharged from a discharge pipe 11.

The refrigerant having taken on this supercritical state of high temperature and high pressure enters the radiator 2, in which it is cooled by heat radiation. After that, it is guided to the decompressor 3 to be reduced in pressure to its vaporization pressure to become wet steam of low temperature and low pressure, exchanges heat in the vaporizer 4 with the air passing here to become gaseous and, after being used for space cooling by cooling the air in the vehicle in the case of a car-mounted air conditioner, is returned to the linear compressor 1 again.

Where oil in a quantity corresponding to only about 0.5 weight % of the enclosed quantity of carbon dioxide gas ($CO_2$) (if, for instance, the quantity of carbon dioxide gas ($CO_2$) is 1000 grams, that of oil is 5 grams) is enclosed in this way, the radiator can be made compact by effectively utilizing the high heat transfer rate of carbon dioxide gas ($CO_2$) without inviting a drop in heat transfer rate or an increase in pressure loss in the radiator 2, and moreover a deterioration in performance due to a pressure loss can be kept to the minimum.

Moreover in this embodiment of the invention, by using of the linear compressor 1, the refrigerating cycle apparatus using as refrigerant carbon dioxide gas ($CO_2$) whose pressure in the high pressure side circuit (the refrigerant circuit from the outlet (the discharge pipe 11) of the compressor 1 via the radiator 2 to the inlet of the decompressor 3) enters the supercritical region of about 10 MPa, resulting in a very large pressure difference from the low pressure side circuit (the refrigerant circuit from the outlet of the decompressor 3 via the vaporizer 4 to the inlet (the intake pipe 9) of the compressor 1) is made possible operation without sacrificing reliability, and the mechanical loss of the compressor due to the increased slide-frictional load ensuing from the large pressure difference can be prevented from increasing.

Further, the linear compressor can also be improved in durability and reduced in the coefficient of friction by applying surface treatment to the piston or the cylinder, and operated without using oil. Alternatively, by using a gas bearing that can cause the refrigerant gas circulating in the refrigerant circuit to flow under high pressure between the piston and the cylinder, the compressor can be operated without using oil. Or by forming a porous surface layer over the piston or the cylinder, it can be operated with a very small quantity of oil because the oil is held by the porous surface layer.

Also, if it is made possible to use only an extremely small quantity of it, there will be a secondary advantage that it is not only unnecessary to take into account any reaction between, and the characteristics of, the $CO_2$ and the oil that are used but also it is made possible to reduce the quantity of the $CO_2$ refrigerant that is used because there will be no dissolution of $CO_2$ into the oil. Moreover, there will be another secondary advantage, that no particular consideration is needed for return of the refrigerating machine oil discharged into the refrigerant circuit to the compressor again (oil return).

Although the foregoing description referred to an example of configuration using a linear compressor, the invention can be implemented with a compressor of some other type as well.

Figure 13:
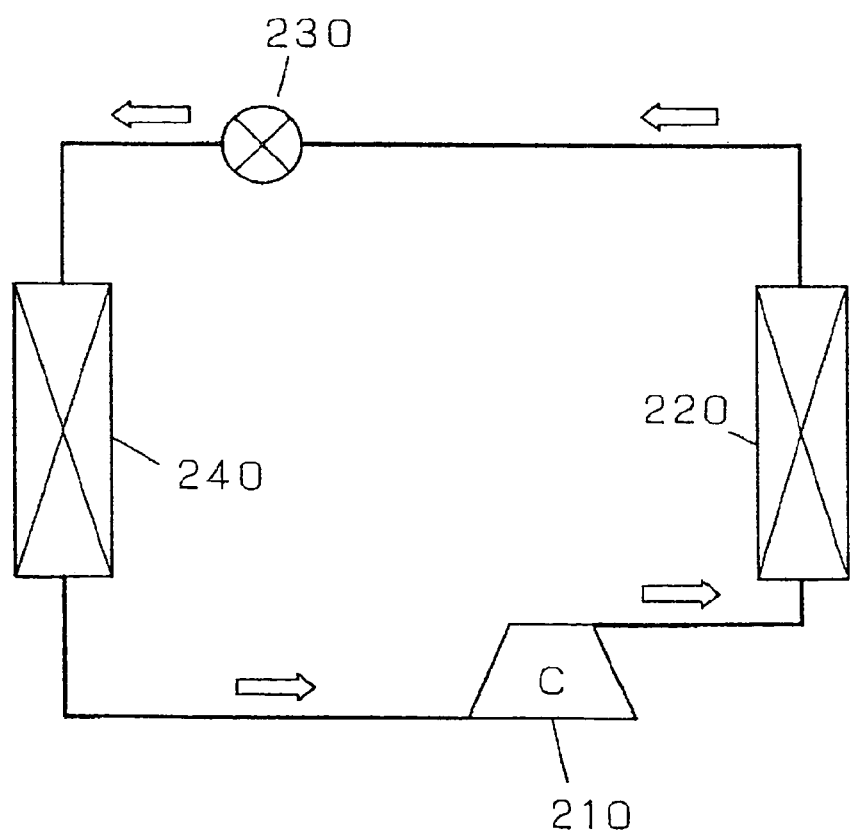
FIG. 13 is a configurational diagram of a refrigerating cycle apparatus according to the prior art.

For instance in a refrigerating cycle apparatus, shown in FIG. 13, having a compressor 210 operating in some other form than that of a linear compressor, a radiator 220, a decompressor 230 and a vaporizer 240, the quantity of oil that is enclosed in the compressor 210 (including the quantity of oil used for assembling the compressor 210) can be kept at or below 40 weight % of the carbon dioxide gas that is enclosed in the refrigerant circuit formed in the refrigerating cycle apparatus.

Figure 2:
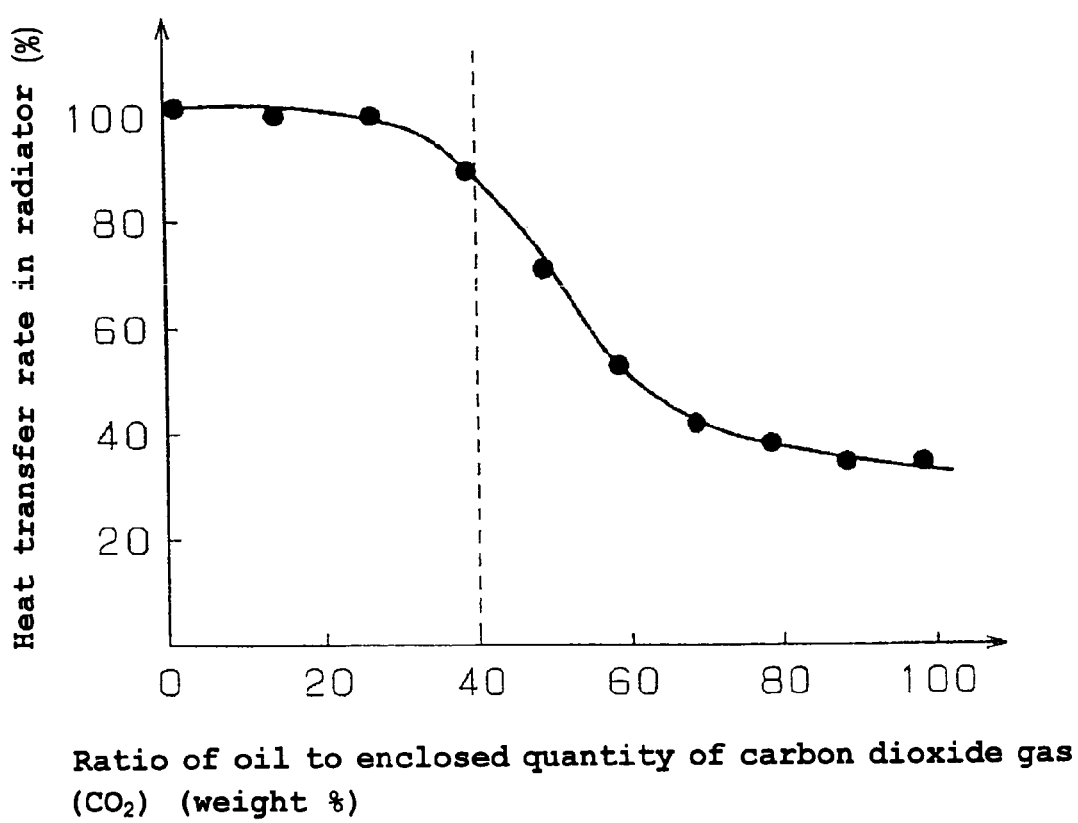
FIG. 2 is a diagram showing an example of variations occurring in heat transfer rate in a radiator when the ratio of oil to the quantity of carbon dioxide gas ($CO_2$) enclosed as refrigerant (weight %) is varied.
Figure 3:
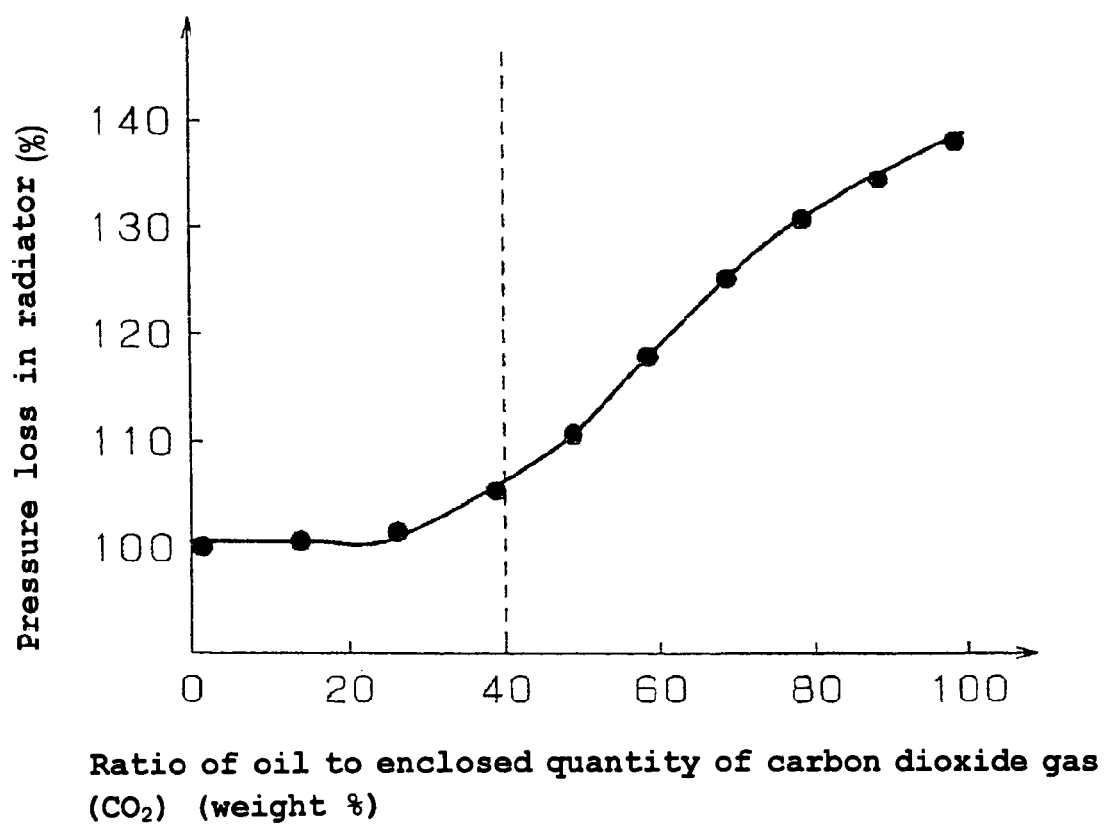
FIG. 3 is a diagram showing an example of variations occurring in pressure loss in a radiator when the ratio of oil to the quantity of carbon dioxide gas ($CO_2$) enclosed as refrigerant (weight %) is varied.

Now, FIG. 2 shows an example of variations occurring in heat transfer rate in the radiator when the ratio of oil to the quantity of carbon dioxide gas ($CO_2$) enclosed as refrigerant (weight %) is varied, and FIG. 3 shows an example of variations occurring in pressure loss in the radiator when the ratio of oil to the quantity of carbon dioxide gas ($CO_2$) enclosed as refrigerant (weight %) is varied.

As is apparent from these drawings, also in a case where a reciprocating type compressor which requires enclosure of refrigerating machine oil, the drop in heat transfer rate can be restrained to about 10% and the increase in pressure loss, to about 5%, both very low levels, in the radiator by keeping the ratio of refrigerating machine oil to the quantity of carbon dioxide gas ($CO_2$) enclosed as refrigerant (weight %) to less than about 40 weight %, and the impacts on the increase in size and the drop in efficiency of the radiator can be almost eliminated.

(Embodiment 2)

Figure 4:
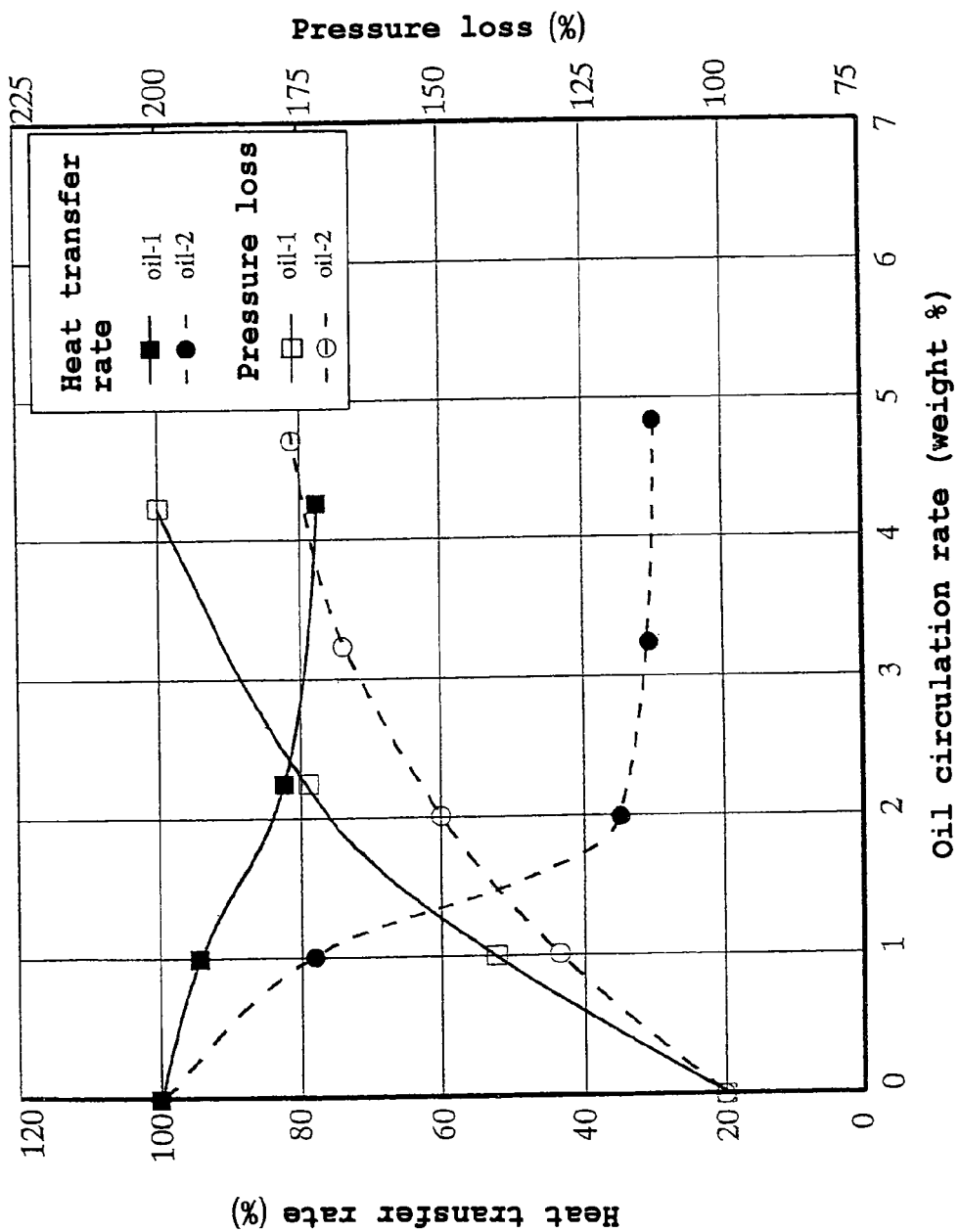
FIG. 4 is a characteristic diagram of the transfer rate of vaporization heat of carbon dioxide gas ($CO_2$) and the pressure loss in a flat tube in Embodiment 1 for Implementation of the invention.

FIG. 4 is a characteristic diagram of the transfer rate of vaporization heat of carbon dioxide gas ($CO_2$) and the pressure loss in a flat tube constituting the vaporizer, having a triangular shape and consisting of 25 small bore through-holes of substantially 0.86 mm in hydraulic power-equivalent diameter.

In FIG. 4, the horizontal axis represents the oil circulating rate figured out by dividing the oil circulating quantity by the refrigerant ($CO_2$) circulating quantity. The vertical axis on the left side is the percentage of the heat transfer rate with the heat transfer rate at an oil circulating rate of 0 weight % being represented by 100, while the vertical axis on the right side is the percentage of the pressure loss with the pressure loss at an oil circulating rate of 0 weight % being represented by 100. FIG. 4 shows the characteristics of two kinds of oil differing in solubility from $CO_2$; the heat transfer rate drops with an increase in oil circulating quantity, the extent of drop differing with the kind of oil. On the other hand, the pressure loss increases with an increase in oil circulating quantity. Further it is imaginable that insoluble oil would manifest similar characteristics with these oils.

Especially where the oil circulating rate is greater than 1.5 weight %, irrespective of the kind of oil, the heat transfer rate drops extremely.

Therefore, in order to prevent the transfer rate of vaporization heat of $CO_2$ from dropping and the pressure loss from increasing, it is preferable to keep the oil circulating rate within the flat tube at or below 1.5 weight %.

It is seen that, in order to enhance the transfer rate of vaporization heat of $CO_2$ and reduce the pressure loss, it is effective to reduce the solid is charged together with $CO_2$ to an extremely small quantity or not to use oil at all. Thus, where the refrigerant channel is to be provided with a vaporizer consisting of a plurality of through-holes formed by drawing a flat tube, a refrigerating cycle apparatus using $CO_2$ of which a drop in the transfer rate of vaporization heat can be minimized with a minimized increase, if any, in pressure loss can be realized by keeping the oil circulating rate at least at the vaporizer inlet at or less than 1.5 weight %.

Further, there is no necessity to limit the foregoing to the vaporizer inlet, but if the oil circulating rate in any of the other parts constituting the refrigerant circuit in the refrigerating cycle apparatus is 1.5 weight % or below, a refrigerating cycle apparatus using $CO_2$ of which a drop in the transfer rate of vaporization heat is minimized can be realized without inviting an increase in pressure loss. The foregoing, however, refers to the refrigerant circuit except the compressor. (Namely, the oil circulating rate within the compressor may be greater than substantially 1.5 weight %.)

Here, based on various experimental data including the characteristic data of the transfer rate of vaporization heat and the pressure loss shown in FIG. 4, the transfer rate of vaporization heat and the pressure loss in the flat tube where oil and $CO_2$ circulate well agree with values calculated by the correlation formulas stated below.

Thus, regarding the transfer rate of vaporization heat, the Liu-Winterton correlation formula generally known as the correlation formula of the transfer rate of intra-tube vaporization heat is modified with a parameter Kf which takes into account the impact of oil mixing on the heat transfer rate of nuclear boiling, and regarding the heat transfer rate of forced convection, modification is made to transform the physical property values of the liquid into the value of a mixture of the refrigerant and the oil:

$$h = a \cdot \{(E \cdot hl)^2 + (S \cdot hpool)^2\}^{0.5} \qquad \text{Formula 1}$$

$$hpool = 55 \cdot (P/Pc)^{0.12} \cdot \{-\log(P/Pc)\}^{-0.55} \cdot M \cdot q^{0.67} \cdot Kf \qquad \text{Formula 2}$$

where h is the transfer rate of vaporization heat; a, a constant; hl, the heat transfer rate of forced convection where only the liquid phase is deemed to flow; hpool, the heat transfer rate of pool boiling: and E and S, parameters representing the degrees of forced convection and nuclear boiling, respectively.

As regards the pressure loss on the other hand, the Lockhart-Martinelli correlation formula generally known as the correlation formula of two phase flow pressure loss is modified to transform the physical property values of the liquid into the value of a mixture of the refrigerant and the oil:

$$\Delta P = \phi^2 \cdot \Delta Pf \qquad \text{Formula 3}$$

where $\Delta Pf$ is the friction loss in a state where only the liquid phase is deemed to flow.

Figure 5:
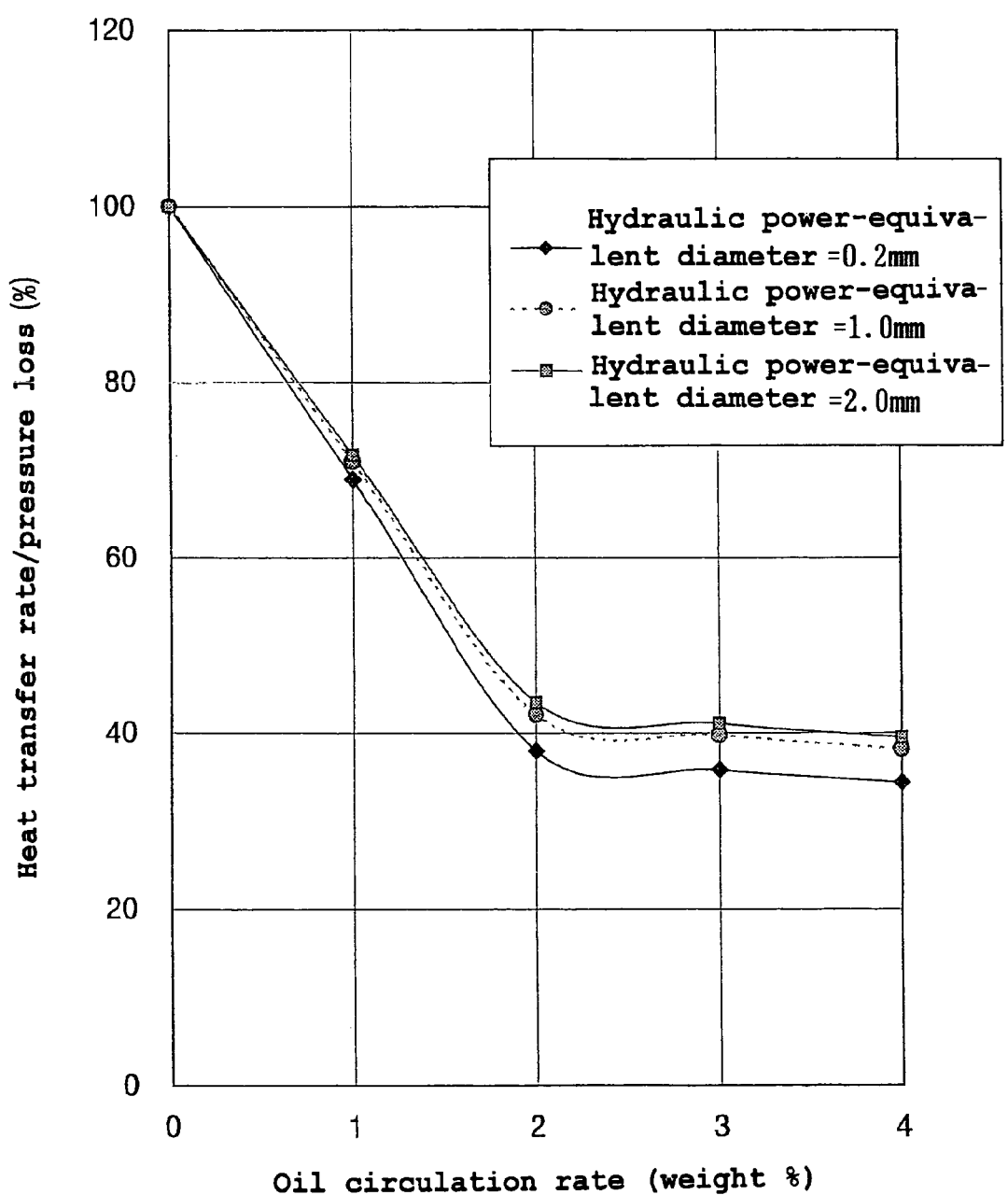
FIG. 5 is a characteristic diagram of the transfer rate of vaporization heat of carbon dioxide gas ($CO_2$) versus the pressure loss in a flat tube in Embodiment 2 for Implementation of the invention.
Figure 6:
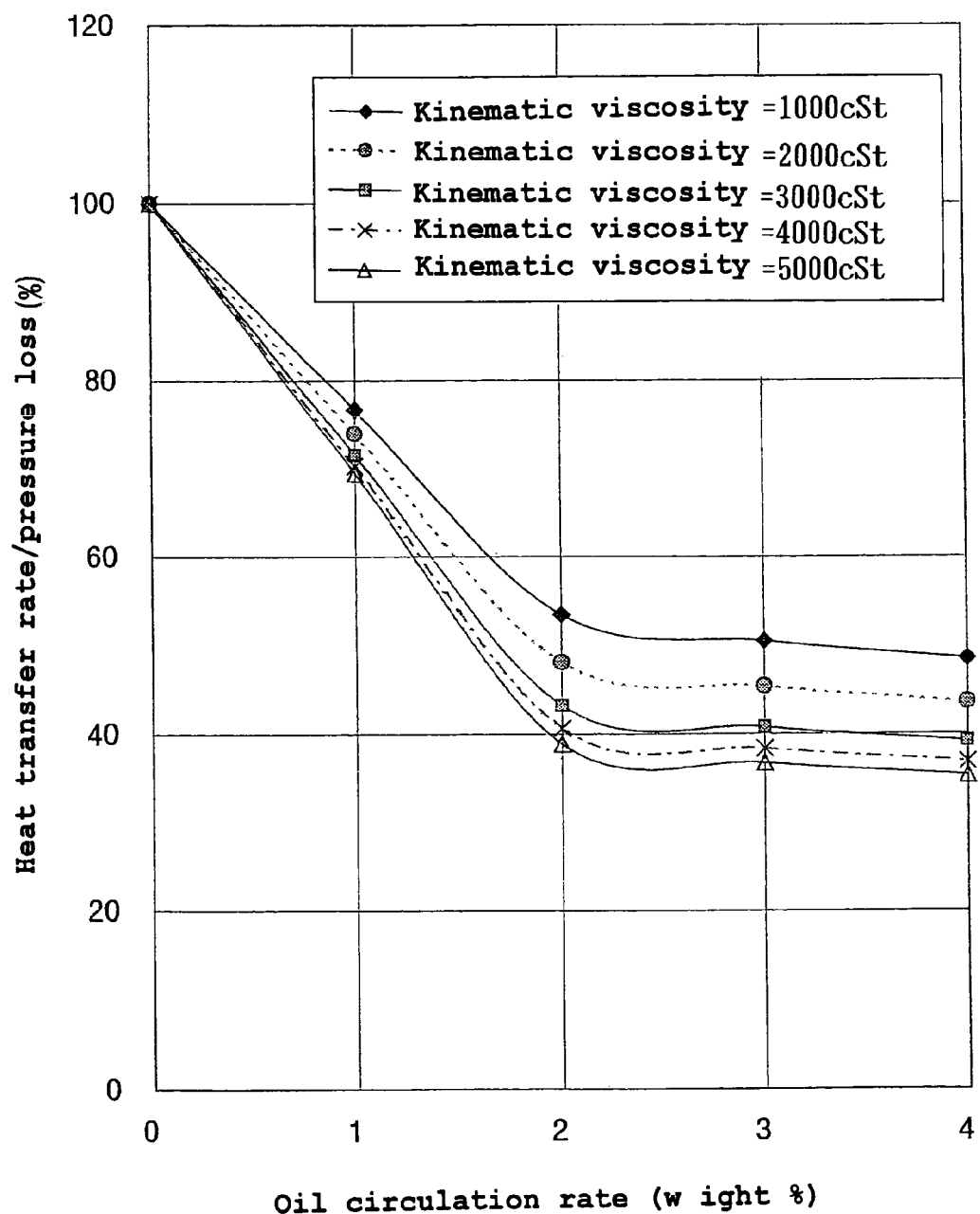
FIG. 6 is a characteristic diagram of the transfer rate of vaporization heat of carbon dioxide gas ($CO_2$) versus the pressure loss in a flat tube in Embodiment 2 for Implementation of the invention.

Next, FIGS. 5 and 6 are characteristic diagrams of the transfer rate of vaporization heat of $CO_2$ and the pressure loss figured out by the correlation formulas stated above.

In FIGS. 5 and 6, the horizontal axis represents the oil circulating rate obtained by dividing the oil circulating quantity by the refrigerant circulating quantity. On the other hand, the vertical axis represents the percentage of the quotient of the division of the ratio of the heat transfer rate, with the heat transfer rate at an oil circulating rate of 0 weight % being represented by 100 (computed by (Formula 1) and (Formula 2) above) by the ratio of the pressure loss, with the pressure loss at an oil circulating rate of 0 weight % being represented by 100 (computed by (Formula 3) above). Thus, the quotient is 100 when the oil circulating rate is 0 weight %, and the heavier the drop of the heat transfer rate and/or the greater the rise of the pressure loss due to an increase in oil circulating quantity, the less it is than 100.

FIG. 6, showing characteristics pertaining to oils differing in kinematic viscosity, reveals that the heat transfer rate extremely drops when the oil circulating rate is greater than substantially 1.5 weight % with oils used in conventional refrigerating cycle apparatuses, for instance oils whose kinematic viscosity in the vaporizer is between 1000 to 5000 cSt approximately (including insoluble oils).

On the other hand, FIG. 5, showing characteristics pertaining to through-holes differing in hydraulic power-equivalent diameter, reveals that the heat transfer rate extremely drops when the oil circulating rate is greater than 1.5 weight % in the range of hydraulic power-equivalent diameter from 0.2 mm to 2.0 mm. Incidentally, as the data are rearranged using hydraulic power-equivalent diameters cleared of the impacts pertaining to the number and shape of through-holes, it can be readily imagined that the aforementioned tendency holds true irrespective of the number of through-holes of the shape of through-holes in the vaporizer.

Therefore, even if the kind of oil or the shape or number of through-holes differ from what are respectively shown in the characteristic diagram of FIG. 4, in order to prevent the transfer rate of vaporization heat of $CO_2$ from dropping and the pressure loss from increasing, it is preferable to keep the oil circulating rate within the flat tube at or below 1.5 weight % if the hydraulic power-equivalent diameter of the through-holes is from 0.2 mm to 2.0 mm.

(Embodiment 3)

Figure 7:
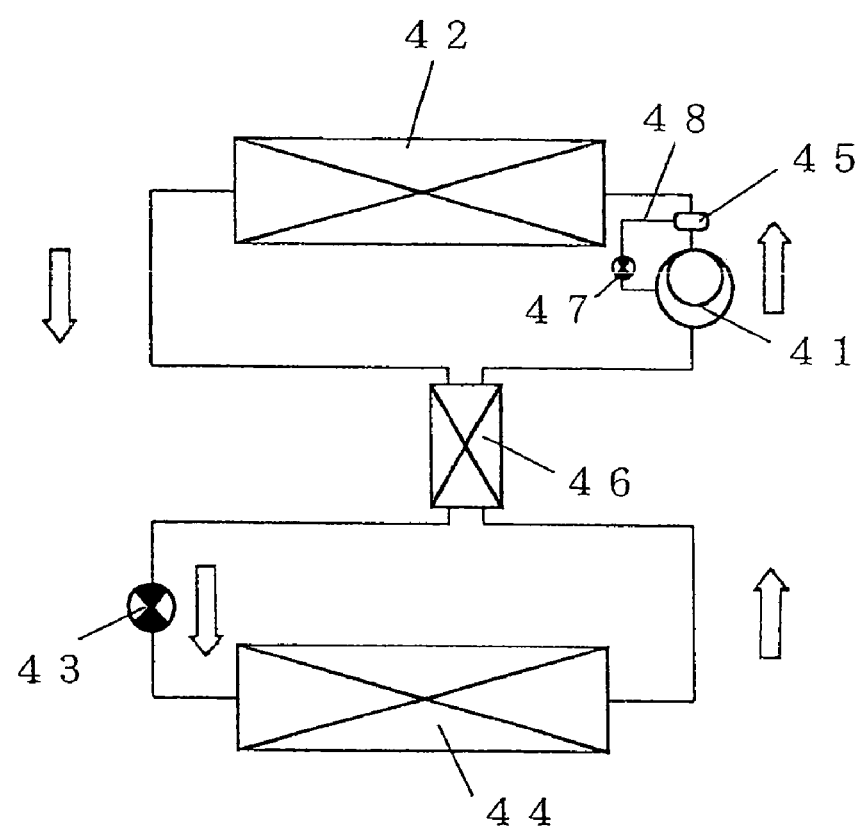
FIG. 7 is a schematic configurational diagram of the refrigerating cycle apparatus in Embodiment 3 for Implementation of the invention.

A schematic configuration of a refrigerating cycle apparatus in Embodiment 3 of the invention is shown in FIG. 7. In FIG. 7, 41 denotes a compressor; 42, a radiator; 43, a decompressor; and 44, a vaporizer; by connecting these items by piping, a refrigerant circuit in which the refrigerant circulates in the direction of arrows in the drawing is configured, and carbon dioxide gas ($CO_2$) is enclosed in the refrigerant circuit. Between the compressor 41 and the radiator 42 is provided an oil separator 45, and the oil separated by the oil separator 45, the outlet of the oil separator 45 being branched, is returned to the compressor 41 by an auxiliary route 48 connected by piping to the compressor 41 via an auxiliary decompressor 47. Further, there is provided an auxiliary heat exchanger 46 for exchanging between the radiating side refrigerant channel, which is the refrigerant channel from the outlet of the radiator 42 to the inlet of the decompressor 43, and the vaporization side refrigerant channel, which is the refrigerant channel from the outlet of the vaporizer 44 to the intake part of the compressor 41. To add, the oil separator 45 corresponds to a first oil separator according to the present invention; the auxiliary route 48, first oil return means according to the invention; and the auxiliary heat exchanger 46, a first auxiliary heat exchanger according to the invention.

The operation of the refrigerating cycle apparatus having the above-described configuration in this embodiment will be described below. $CO_2$ compressed by the compressor 41 (compressed to, for instance, about 10 MPa in this embodiment) enters into a state of high temperature and high pressure and, after the oil discharged from the compressor 41 together with the refrigerant is separated by the oil separator 45, is introduced into the radiator 42. The oil separated from the refrigerant, on the other hand, is returned to the compressor 41 via the auxiliary route 48.

As $CO_2$ is in the supercritical state in the radiator 42, it may not enter into a gas-liquid two phase state, instead radiates heat into a medium, such as air or water, and is further cooled in the radiating side refrigerant channel from the outlet of the radiator 42 of the auxiliary heat exchanger 46 to the inlet of the decompressor 43. In the decompressor 43, $CO_2$ is decompressed (decompressed to, for instance, about 3.5 MPa in this embodiment) to enter into a low pressure state of gas-liquid two phases, and introduced into the vaporizer 44. In the vaporizer 44, it absorbs heat from air or the like, enters into a gaseous state in the vaporization side refrigerant channel extending from the outlet of the vaporizer 44 of the auxiliary heat exchanger 46 to the intake part of the compressor 41, and is again taken into the compressor 41. By repeating such a cycle, the radiator 42 performs heating by heat radiation and the vaporizer 44, cooling by heat absorption.

Here in the auxiliary heat exchanger 46, heat is exchanged between a refrigerant of relatively high temperature that comes out of the radiator 42 and is directed to the decompressor 43 and a refrigerant of relatively low temperature that comes out of the vaporizer 44 and is directed to the compressor 41. Since the $CO_2$ coming out of the radiator 42 is further cooled as a result and reduced in pressure by the decompressor 43, the inlet enthalpy of the vaporizer 44 decreases and the enthalpy difference between the inlet and the outlet of the vaporizer 44 expands, resulting in an increased heat absorbing capacity (cooling capacity).

Figure 8:
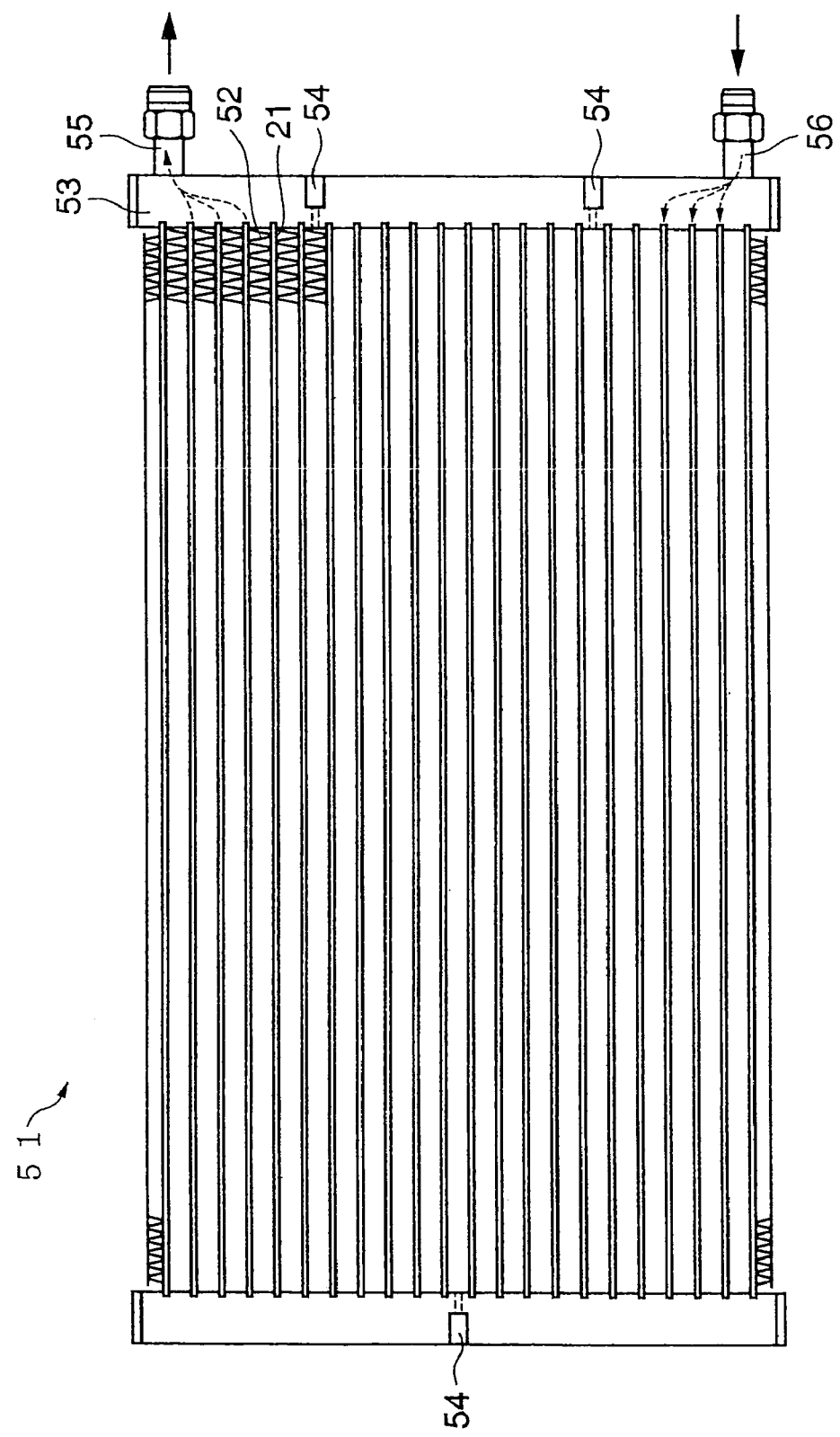
FIG. 8 is a schematic configurational diagram of a vaporizer in Embodiment 3 or 4 for Implementation of the invention.

Next, FIG. 8 is a schematic configurational diagram of a heat exchanger 51 constituting the vaporizer 44 in this embodiment. In FIG. 8, 52 denotes a core part in which heat is exchanged between $CO_2$ and air, and this core part 52 has a configuration in which a plurality of aluminum-made flat tubes 21 to let $CO_2$ circulate and a plurality of aluminum-made fins 22, formed in a corrugated shape, are alternately stacked over each other in the direction of the thickness of the flat tubes 21.

At both ends of the plurality of flat tubes 21 in the lengthwise direction, a pair of header tanks 53 in which internal spaces are formed continuous to the plurality of flat tubes 21 (the through-holes 21a shown in FIG. 12) are arranged, extending to orthogonally cross the lengthwise direction of the flat tubes 21. The header tanks 53, formed by extrusion, drawing or die casting, have sufficient strength against pressure. In FIG. 8, 54 denotes separators for dividing the internal spaces of the header tanks 53 into a plurality of partitions; 55, a connecting pipe to be connected to the intake part of the compressor 41; 56, a connecting pipe to be connected to the outlet side of the decompressor 3. Incidentally, solid line arrows and broken line arrows in FIG. 8 represent the flows of $CO_2$; $CO_2$ flowing in from the lower connecting pipe 56, bounded by the separators 54, is vaporized within the flat tubes 21 of the heat exchanger 51 while passing the header tanks 53 consecutively, and flows out into the compressor 41 from the upper connecting pipe 55.

Figure 12:
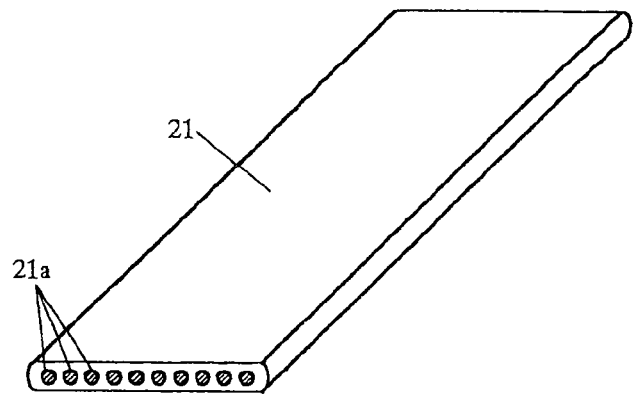
FIG. 12 is a schematic configurational diagram of a flat tube in Embodiments 2 through 4 of the invention.

Also, in the flat tubes 21, similarly to those shown in FIG. 12, a plurality of small bore through-holes 21a penetrating the flat tubes 21 in their lengthwise direction to constitute a refrigerant channel are formed, and these through-holes 21a are formed integrally with the flat tubes 21. The flat tubes 21 constituting a refrigerant channel in which $CO_2$ in a relatively high pressure state flows in the heat exchanger 51 is formed by extrusion or drawing and, because the bore of through-holes in which the refrigerant circulates can be formed small, have sufficient strength against resistance. The sectional shape of the through-holes 21a is either round or rectangular with the corners being rounded so that the sectional shape can be enlarged while easing the concentration of stresses. It is preferable here, from the viewpoint of pressure loss at the time of the vaporization of $CO_2$, for the hydraulic power-equivalent diameter of the through-holes of the flat tubes 21 on the outflow side of the heat exchanger 51 to be not smaller than the hydraulic power-equivalent diameter of the through-holes on the inflow side of the flat tubes 21.

Figure 9:
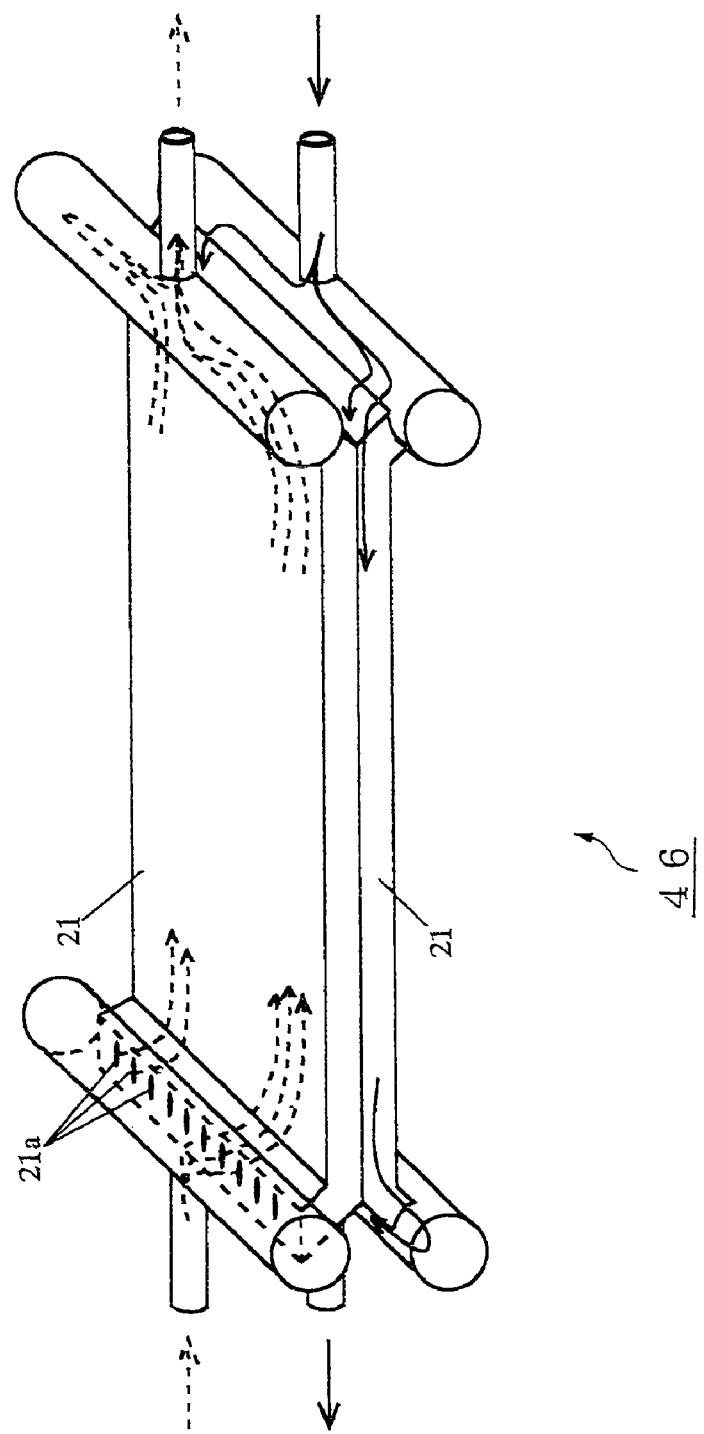
FIG. 9 is a schematic configurational diagram of an auxiliary heat exchanger in Embodiment 3 or 4 for Implementation of the invention.

In the auxiliary heat exchanger 46, as shown in FIG. 9, both the radiating side refrigerant channel from the outlet of the radiator 42 to the inlet of the decompressor 43 and the vaporization side refrigerant channel from the outlet of the vaporizer 44 to the intake part of the compressor 1 are provided with a plurality each of small bore through-holes 21a formed by drawing in the flat tubes 21. And each of the directions where $CO_2$ flows has faced mutually.

Further in the auxiliary heat exchanger 46, the hydraulic power-equivalent diameter of the through-holes of the vaporization side refrigerant channel from the outlet of the vaporizer 44 to the intake part of the compressor 41 is not smaller than the hydraulic power-equivalent diameter of the through-holes of the outlet of the vaporizer 44. More specifically, for instance, if the number of outlet paths of the vaporizer 44 is equal to the number of paths of the vaporization side refrigerant channel of the auxiliary heat exchanger 46, the bore of the through-holes 21a of the vaporization side refrigerant channel of the auxiliary heat exchanger 46 should not be smaller than the bore of the through-holes 21a of the outlet of the vaporizer 44. It is thereby made possible to prevent the adverse consequence that the pressure loss per unit increases as the dryness resulting from vaporization increases.

These configurational features prevent the oil from flowing into the radiator 42, the vaporizer 44 and the flat tubes 21 consisting of a plurality of small bore through-holes 21a of the auxiliary heat exchanger 46, and it is thereby made possible to realize a refrigerating cycle apparatus using $CO_2$ which is reduced in heat transfer rate drop without inviting an increase in pressure loss in the radiator, the vaporizer and the auxiliary heat exchanger.

Especially in the vaporizer, as the oil circulating rate at the inlet of the vaporizer 44 is not more than substantially 1.5 weight %, it is possible to realize a refrigerating cycle apparatus using $CO_2$ minimized in the drop of the transfer rate of vaporization heat while minimizing the increase in pressure loss.

To add, although the foregoing description supposed that the compressor 41 would operate in the usual form, the linear compressor in Embodiment 1 for Implementation may be used as well. In this case, as the quantity of the oil discharged from the compressor 41 together with the refrigerant is either 0 or very small, it is possible to realize a refrigerating cycle apparatus in a configuration dispensing with the oil separator 45, the auxiliary decompressor 47 and the auxiliary route 48.

The oil separator 45 may as well be so configured as to be integrated with and contained in the compressor 41. In this case, it is made possible to extremely shorten the auxiliary route 48, resulting in the advantage that the refrigerating cycle apparatus can be reduced in size and made more convenient to install.

(Embodiment 4)

Figure 10:
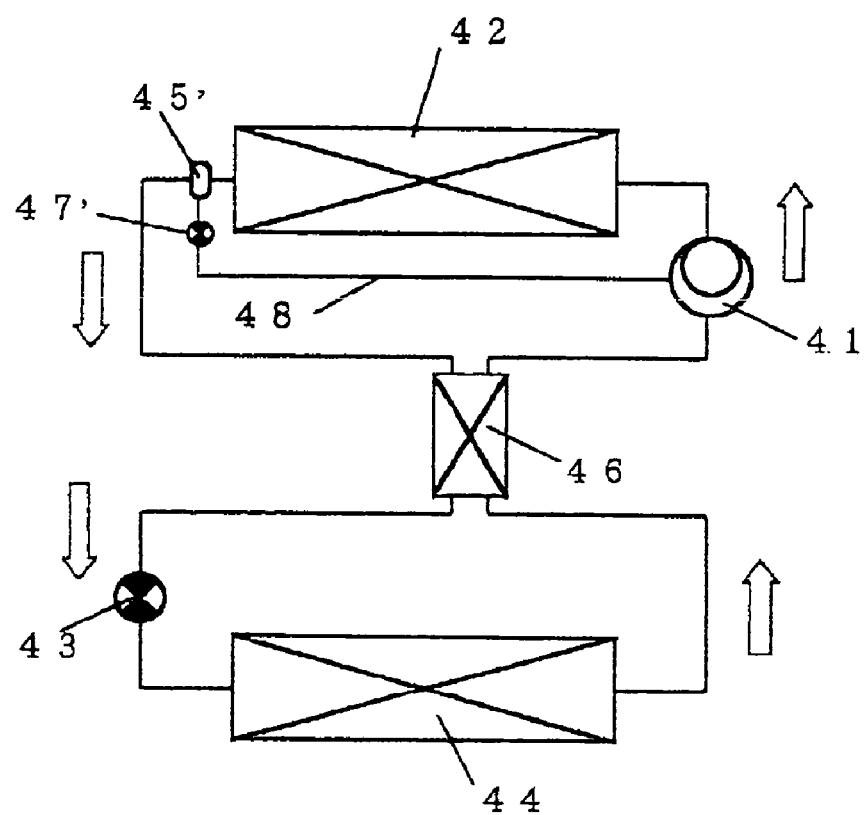
FIG. 10 is a schematic configurational diagram of a refrigerating cycle apparatus in Embodiment 4 for Implementation of the invention.
Figure 11:
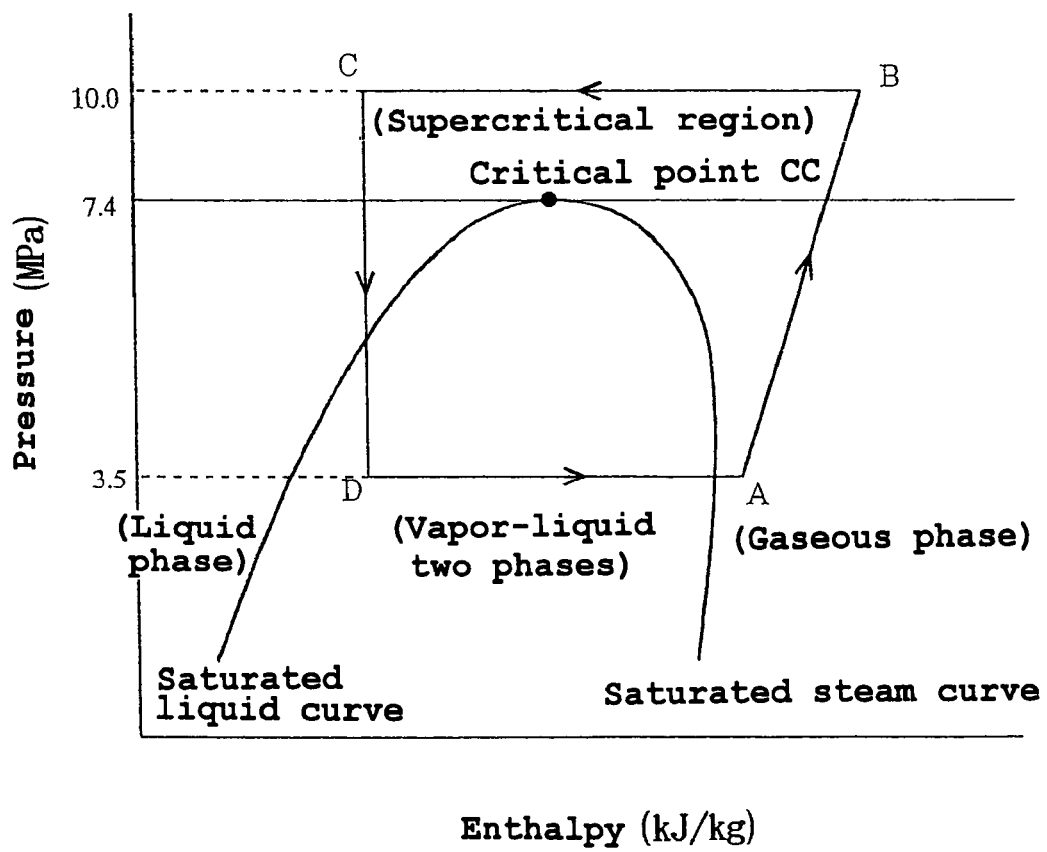
FIG. 11 is a modeled Mollier diagram of a refrigerating cycle where carbon dioxide gas ($CO_2$) is used.

A schematic configuration of a refrigerating cycle apparatus in Embodiment 4 for Implementation of the invention is shown in FIG. 10. In FIG. 10, the same constituent elements as in FIG. 7 are designated by the same reference signs, and their description will be dispensed with. The refrigerating cycle apparatus in this embodiment differs from that in Embodiment 3 for Implementation in that it is provided with an oil separator 45' and an auxiliary decompressor 47' both different in arrangement. Thus, the oil separator 45' is provided on the refrigerant outlet side of the radiator 42 and is connected to the compressor 41 by piping via the auxiliary decompressor 47'. The configuration is such that the oil separated by the oil separator 45', branched at the outlet of the oil separator 45', is returned to the compressor 41 by an auxiliary route 48' connected by piping to the compressor 41 via the auxiliary decompressor 47'. To add, the oil separator 45' corresponds to a second oil separator according to the invention, and the auxiliary route 48', to second oil return means according to the invention.

The operation of the refrigerating cycle apparatus in this embodiment, having the above-described configuration is basically similar to that in Embodiment 3 for Implementation, but $CO_2$ compressed by the compressor 41 (compressed to, for instance, about 10 MPa in this embodiment), together with oil, enters into a high temperature and high pressure state, and introduced into the radiator 42.

The oil cooled by the radiator 42 together with the refrigerant is separated from the refrigerant by the oil separator 45', and returns to the compressor 41 via the auxiliary route 48'. As the subsequent action of the refrigerant takes place in the same way as in Embodiment 3 for Implementation, its description will be dispensed with.

The configuration described above, as in Embodiment 3 for Implementation, serves to prevent the oil from flowing into the auxiliary heat exchanger 46 or the flat tube consisting of a plurality of small bore through-holes of the vaporizer 44 and, as at least the oil circulating rate at the inlet of the vaporizer 44 is kept at or below 1.5 weight %, it is possible to realize a refrigerating cycle apparatus using $CO_2$ minimized in the drop of the transfer rate of vaporization heat while minimizing the increase in pressure loss.

To add, although the foregoing description supposed that the compressor 41 would operate in the usual form, the linear compressor in Embodiment 1 for Implementation may be used as well. In this case, as the quantity of the oil discharged from the compressor 41 together with the refrigerant is either 0 or very small, it is possible to realize a refrigerating cycle apparatus in a configuration dispensing with the oil separator 45', the auxiliary decompressor 47' and the auxiliary route 48'.

As is apparent from the foregoing description, since according to the present invention carbon dioxide gas ($CO_2$) is enclosed as refrigerant and the quantity of oil enclosed for lubrication of the compressor during its assembling and operation is kept to not more than substantially 40 weight % of the enclosed quantity of carbon dioxide gas ($CO_2$), it is possible to keep small the drop in heat transfer rate and the increase in pressure loss in the radiator and the vaporizer, and an increase in size or an influence to invite a drip in efficiency of the radiator and the vaporizer can be almost eliminated.

Also, as a linear compressor consisting of a linear motor, a piston, a cylinder and so forth is used as compressor according to the invention, even in a refrigerating cycle apparatus using carbon dioxide gas ($CO_2$) as refrigerant in which the pressure of the high pressure side circuit is in a supercritical region of about 10 MPa and the difference in pressure from the low pressure side circuit becomes very great, an increase in the mechanical loss of the compressor due to an increase in slide-frictional load ensuing from the wide difference in pressure can be prevented, and operation is made possible without sacrificing reliability.

Also, since no other oil than what was used in assembling the compressor, such as lubricating oil, is enclosed into the refrigerating cycle according to the invention, especially where it is applied to a car-mounted air conditioner, there is no need to take account of the return of the refrigerating machine oil discharged into the refrigerating cycle to the compressor again (oil return), there are provided significant practical effects including increased freedom of design.

Furthermore, by virtue of the use of an oil separator or a linear compressor which hardly used oil according to the invention, the oil circulating rate at the vaporizer inlet is kept at or below about 1.5 weight %, and it is made possible to realize a refrigerating cycle apparatus minimized in the drop of the transfer rate of vaporization heat while minimizing the increase in pressure loss in the vaporizer in which the refrigerant channel consists of a plurality of through-holes formed in a flat tube and the vaporization side refrigerant channel of the auxiliary heat exchanger The configuration described above makes it possible to prevent the transfer rate of vaporization heat from dropping and the pressure loss from increasing even where carbon dioxide gas ($CO_2$) is used as refrigerant, which enters into a supercritical region in the high pressure side circuit, and to provide a compact and highly efficient refrigerating cycle apparatus.

Industrial Applicability

What is claimed is:

1. A refrigerating cycle apparatus comprising at least a compressor for raising the pressure of refrigerant; a radiator for cooling the refrigerant raised in pressure by said compressor; a decompressor, arranged further downstream of the refrigerant flow than said radiator, for decompressing and expanding said cooled refrigerant; a vaporizer for heating the refrigerant decompressed by said decompressor; and piping for consecutively connecting said compressor, said radiator, said decompressor and said vaporizer, and provided with a refrigerant circuit in which said refrigerant circulates within said compressor, said radiator, said decompressor, said vaporizer and said piping, wherein carbon dioxide gas ($CO_2$) is enclosed as said refrigerant, and a quantity of oil in said refrigerant circuit is not more than 40 weight % of the enclosed quantity of said $CO_2$ and more than 0; and said refrigerating cycle apparatus is further provided with an auxiliary heat exchanger for exchanging heat between the radiating side refrigerant channel formed between the refrigerant outlet side of said radiator and the inlet side of said decompressor and the vaporizing side refrigerant channel formed between the refrigerant outlet side of said vaporizer and the intake part of said compressor, wherein:

the vaporization side refrigerant channel within said auxiliary heat exchanger has a plurality of through-holes formed in a flat tube; and a hydraulic power-equivalent diameter of said through-holes of the vaporization side refrigerant channel within said auxiliary heat exchanger is not smaller than the hydraulic power-equivalent diameter of the through-holes of the outlet of said vaporizer.

2. The refrigerating cycle apparatus, as set forth in claim 1, wherein said compressor is a linear compressor driven by a linear motor.

3. The refrigerating cycle apparatus, as set forth in claim 1 or 2, wherein said oil is not used except in assembling said refrigerating cycle apparatus.

4. A refrigerating cycle apparatus comprising at least a compressor for raising the pressure of refrigerant; a radiator for cooling the refrigerant raised in pressure by said compressor; a decompressor, arranged further downstream of the refrigerant flow than said radiator, for decompressing and expanding said cooled refrigerant; a vaporizer for heating the refrigerant decompressed by said decompressor; and piping for consecutively connecting said compressor, said radiator, said decompressor and said vaporizer; and provided with a refrigerant circuit in which said refrigerant circulates within said compressor, said radiator, said decompressor, said vaporizer and said piping, wherein carbon dioxide gas ($CO_2$) is enclosed as said refrigerant, and said vaporizer has a plurality of through-holes formed in a flat tube as a refrigerant channel, and an oil circulating rate, which is a ratio of the quantity of oil circulating in any part of said refrigerant circuit except the inside of said compressor to a quantity of $CO_2$ circulating in said part, is not more than about 1.5 weight %; and said refrigerating cycle apparatus is further provided with an auxiliary heat exchanger for exchanging heat between the radiating side refrigerant channel formed between the refrigerant outlet side of said radiator and the inlet side of said decompressor and the vaporizing side refrigerant channel formed between the refrigerant outlet side of said vaporizer and the intake part of said compressor, wherein:

the vaporization side refrigerant channel within said auxiliary heat exchanger has a plurality of through-holes formed in a flat tube; and a hydraulic power-equivalent diameter of said through-holes of the vaporization side refrigerant channel within said auxiliary heat exchanger is not smaller than the hydraulic power-equivalent diameter of the through-holes of the outlet of said vaporizer.

5. The refrigerating cycle apparatus, as set forth in claim 4, wherein the hydraulic power-equivalent diameter of said through-holes is 0.2 mm to 2.0 mm.

6. The refrigerating cycle apparatus, as set forth in claim 4, further provided with first oil separator disposed between said compressor and said radiator, and first oil return means, disposed between said first oil separator and said compressor, of returning to said compressor oil separated by said first oil separator.

7. The refrigerating cycle apparatus, as set forth in claim 6, wherein said first oil separator is integrated with said compressor.

8. The refrigerating cycle apparatus, as set forth in claim 1 or 4, further provided with a second oil separator disposed between the refrigerant outlet of said radiator and the refrigerant inlet of said auxiliary heat exchanger, and second oil return means, disposed between said second oil separator and said compressor, of returning to said compressor oil separated by said second oil separator.

9. The refrigerating cycle apparatus, as set forth in claim 4, wherein said compressor is a linear compressor driven by a linear motor.

10. The refrigerating cycle apparatus, as set forth in claim 1 or 4, wherein, within said auxiliary heat exchanger, said radiating side refrigerant channel also has a plurality of through-holes formed in a flat tube.

11. The refrigerating cycle apparatus, as set forth in claim 1 or 4, wherein said oil is soluble in said $CO_2$.

12. The refrigerating cycle apparatus, as set forth in claim 8, wherein said oil is soluble in said $CO_2$.

13. The refrigerating cycle apparatus, as set forth in claim 8, wherein, within said auxiliary heat exchanger, said radiating side refrigerant channel also has a plurality of through-holes formed in a flat tube.

14. The refrigerating cycle apparatus, as set forth in claim 10, wherein said oil is soluble in said $CO_2$.

* * * * *

UNITED STATES PATENT AND TRADEMARK OFFICE
CERTIFICATE OF CORRECTION

PATENT NO. : 6,962,059 B2
DATED : November 8, 2005
INVENTOR(S) : Noriho Okaza et al.

It is certified that error appears in the above-identified patent and that said Letters Patent is hereby corrected as shown below:

<u>Title page,</u>
Item [54], Title, "REFRIGERATING CYCLE DEVICE" should read
-- REFRIGERATING CYCLE APPARATUS --.

Signed and Sealed this

Twenty-fifth Day of April, 2006

JON W. DUDAS
*Director of the United States Patent and Trademark Office*